United States Patent
Meixner et al.

(10) Patent No.: US 11,085,519 B2
(45) Date of Patent: Aug. 10, 2021

(54) TRANSMISSION ARRANGEMENT FOR A MOTOR VEHICLE

(71) Applicant: AUDI AG, Ingolstadt (DE)

(72) Inventors: Christian Meixner, Ingolstadt (DE); Carsten Trautmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 364 days.

(21) Appl. No.: 16/304,829

(22) PCT Filed: Jun. 7, 2017

(86) PCT No.: PCT/EP2017/063777
§ 371 (c)(1),
(2) Date: Nov. 27, 2018

(87) PCT Pub. No.: WO2017/211863
PCT Pub. Date: Dec. 14, 2017

(65) Prior Publication Data
US 2020/0318725 A1    Oct. 8, 2020

(30) Foreign Application Priority Data

Jun. 7, 2016 (DE) .................... 10 2016 209 997.3

(51) Int. Cl.
*F16H 57/022* (2012.01)
*F16C 19/38* (2006.01)
(Continued)

(52) U.S. Cl.
CPC ........... *F16H 57/022* (2013.01); *F16C 19/38* (2013.01); *F16H 1/14* (2013.01); *F16C 2326/01* (2013.01);
(Continued)

(58) Field of Classification Search
CPC .... F16H 2057/0221; F16H 48/38; F16H 1/14; F16H 57/022; F16H 37/0813;
(Continued)

(56) References Cited

U.S. PATENT DOCUMENTS 7,282,006 B2 * 10/2007 Petruska ................. F16C 25/08
384/557
7,726,884 B2 * 6/2010 Hojo ..................... F16H 57/021
384/563
(Continued)

FOREIGN PATENT DOCUMENTS

CN         1926359 A      3/2007
CN       201096184 Y      8/2008
(Continued)

OTHER PUBLICATIONS

Chinese Office Action dated Jan. 25, 2021, in connection with corresponding CN Application No. 201780035258.7 (17 pp., including machine-generated English translation).
(Continued)

*Primary Examiner* — Randell J Krug
(74) *Attorney, Agent, or Firm* — Maier & Maier, PLLC

(57) ABSTRACT

A transmission arrangement for a motor vehicle, having a transmission housing, a first pinion shaft, and a second pinion shaft, which is arranged coaxially to the first pinion shaft, and having a first transmission output shaft and a second transmission output shaft. The first pinion shaft is mounted by a first bearing, and the second pinion shaft is mounted by a second bearing, on the transmission housing, and a first pinion meshing with a first crown gear arranged on the first transmission output shaft is arranged in a rotationally fixed manner on the first pinion shaft, and a second pinion meshing with a second crown gear arranged
(Continued)

on the second transmission output shaft is arranged in a rotationally fixed manner on the second pinion shaft.

9 Claims, 3 Drawing Sheets

(51) Int. Cl.
*F16H 1/14* (2006.01)
*F16H 48/38* (2012.01)

(52) U.S. Cl.
CPC ...... *F16H 48/38* (2013.01); *F16H 2057/0221* (2013.01)

(58) Field of Classification Search
CPC .... F16C 19/541; F16C 19/542; F16C 19/543; F16C 19/547; F16C 19/548; F16C 19/38; F16C 2326/01
See application file for complete search history.

(56) References Cited

U.S. PATENT DOCUMENTS

| | | | |
|---|---|---|---|
| 9,669,710 B2 * | 6/2017 | Meixner | ............ B60K 23/0808 |
| 2006/0160651 A1 | 7/2006 | Petruska et al. | |
| 2009/0202188 A1 | 8/2009 | Fox et al. | |

FOREIGN PATENT DOCUMENTS

| | | |
|---|---|---|
| CN | 101290026 A | 10/2008 |
| CN | 104768788 A | 7/2015 |
| CN | 105452042 A | 3/2016 |
| DE | 19808566 C1 | 7/1999 |
| DE | 19833910 A1 | 2/2000 |
| DE | 10338635 A1 | 3/2005 |
| DE | 102007018929 A1 | 10/2008 |
| DE | 102013012947 A1 | 2/2015 |
| DE | 102013218434 A1 | 2/2015 |
| EP | 1683990 A1 | 7/2006 |
| GB | 2386652 | 9/2003 |
| WO | 99/23390 A1 | 5/1999 |
| WO | 2015/014449 A1 | 2/2015 |

OTHER PUBLICATIONS

Examination Report dated Apr. 13, 2017 in corresponding German Application No. 102016209997.3; 11 pages.

Search Report and Written Opinion dated Aug. 10, 2017 in corresponding International Application No. PCT/EP2017/063777; 19 pages.

Notification of Transmittal of Translation of the International Preliminary Report on Patentability dated Dec. 20, 2018, in connection with corresponding international Application No. PCT/EP2017/063777 (9 pgs.).

* cited by examiner

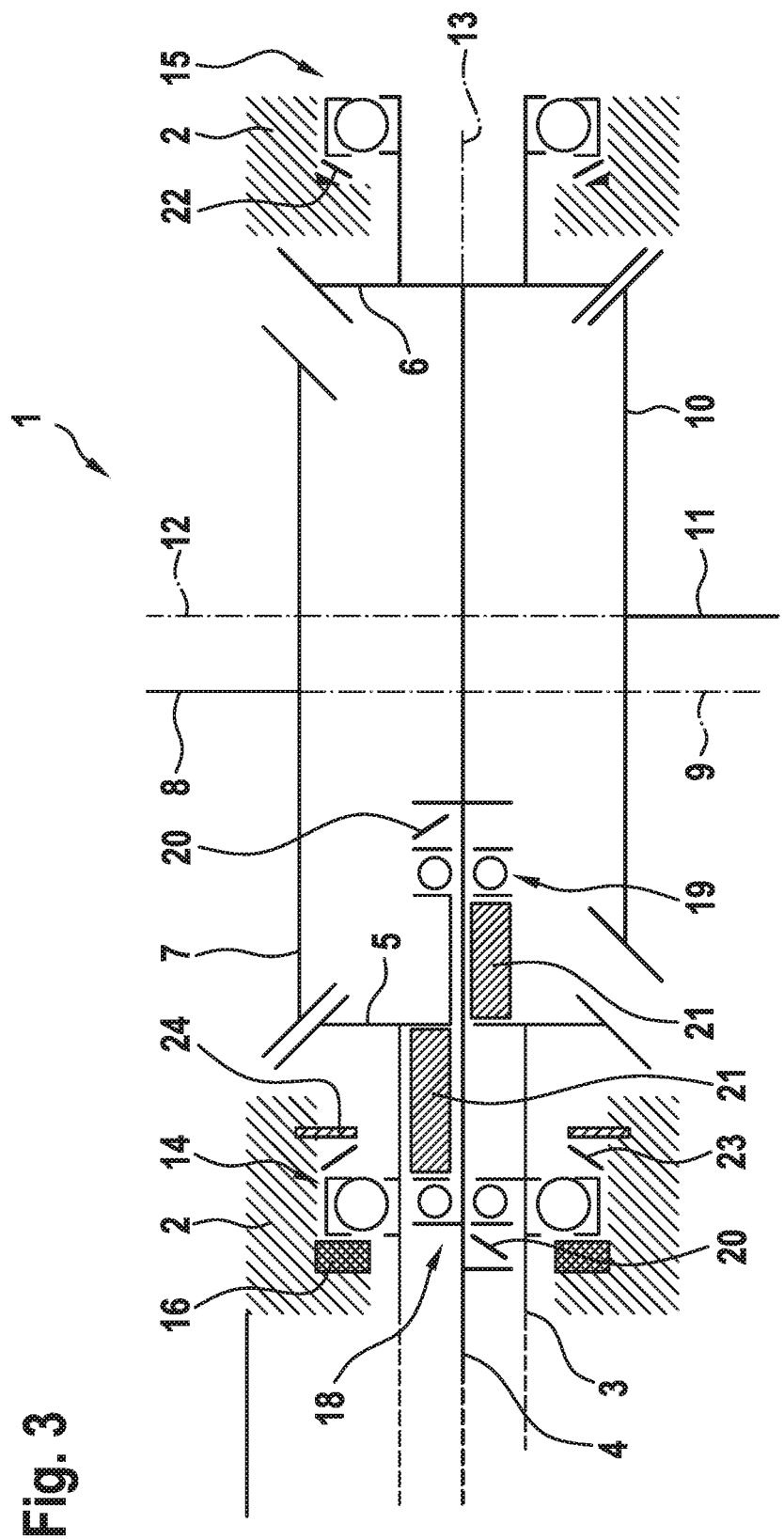

TRANSMISSION ARRANGEMENT FOR A MOTOR VEHICLE

FIELD

The invention relates to a transmission arrangement for a motor vehicle, having a transmission housing, a first pinion shaft, and a second pinion shaft, which is arranged coaxially with respect to the first pinion shaft, and having a first transmission output shaft and a second transmission output shaft, wherein the first pinion shaft is mounted by means of a first bearing and the second pinion shaft is mounted by means of a second bearing on the transmission housing, and wherein a first pinion meshing with a first crown gear arranged on the first transmission output shaft is arranged in a rotationally fixed manner on the first pinion shaft, and a second pinion meshing with a second crown gear arranged on the second transmission output shaft is arranged in a rotationally fixed manner on the second pinion shaft.

BACKGROUND

The transmission arrangement preferably forms a component part of a drivetrain of the motor vehicle. By way of the transmission arrangement, the first pinion shaft is operationally connected or coupled to the first transmission output shaft and the second pinion shaft is operationally connected or coupled to the second transmission output shaft. To this end, the first pinion arranged on the first pinion shaft meshes with the first crown gear of the first transmission output shaft and the second pinion arranged on the second pinion shaft meshes with the second crown gear of the second transmission output shaft. The first pinion shaft and the second pinion shaft are arranged coaxially with respect to each other. To this end, the first pinion shaft is preferably designed as a hollow shaft, in which the second pinion shaft is coaxially arranged. The second pinion shaft is accommodated in this respect at least partially in the first pinion shaft.

The two transmission output shafts are preferably associated with a wheel axle of the motor vehicle, in particular a front axle or a rear axle. For example, they serve for connecting a plurality of wheels of the wheel axle to the pinion shafts. For example, a first wheel of the wheel axle is coupled to or at least can be coupled to the first transmission output shaft, and a second wheel is coupled to or can be coupled to the second transmission output shaft. The two pinion shafts of the transmission arrangement are preferably coupled to a differential transmission, and, in particular, to an axle differential transmission. For example, the pinion shafts are connected to the differential transmission via Cardan shafts that are arranged coaxially with respect to each other. Based on the coaxial arrangement of the two pinion shafts, their axes of rotation coincide.

It may be provided that an axis of rotation of the first transmission output shaft is parallel to an axis of rotation of the second transmission output shaft, and, in particular, is spaced parallel to it. However, the axes of rotation of the transmission output shafts may also coincide. The axes of rotation of the transmission output shafts are preferably at an angle relative to the axes of rotation of the pinion shafts; in particular, the axes of rotation of the transmission output shafts are perpendicular to one of the axes of rotation of the pinion shafts.

SUMMARY

The object of the invention is to propose a transmission arrangement for a motor vehicle, which has advantages over known transmission arrangements and, in particular, makes possible a reliable compensation of temperature or thermal expansion stresses.

This is achieved in accordance with the invention by a transmission arrangement. In this case, it is provided that the first bearing or the second bearing is connected to the transmission housing by way of a temperature expansion compensation element and can be displaced in the axial direction with respect to the axis of rotation of the pinion shafts by the temperature expansion compensation element.

The first bearing serves for bearing the first pinion shaft in or on the transmission housing, and the second bearing serves for bearing the second pinion shaft in or on the transmission housing. The transmission housing has a first thermal expansion coefficient or is composed of a first material that has the first thermal expansion coefficient. At least one of the two pinion shafts, but preferably both of the pinion shafts, has or have a second thermal expansion coefficient or is composed of a second material that has the second thermal expansion coefficient. The second thermal expansion coefficient is different from the first thermal expansion coefficient, because, for example, the second material is different from the first material. Coming into consideration as the first material is, for example, a light metal, in particular aluminum or an aluminum alloy, and, as the second material, iron or an iron alloy, such as, for example, steel.

Accordingly, the transmission housing has a temperature expansion behavior different than that of the two pinion shafts, so that a corresponding compensation has to be provided. This can be realized in an especially preferred way, in that either the first bearing or the second bearing is attached to the transmission housing by way of the temperature expansion compensation element. For example, the temperature expansion compensation element is present between the corresponding bearing and the transmission housing or a wall of the transmission housing, so that the bearing is supported against the transmission housing or the wall thereof via the temperature expansion compensation element.

The bearing can then be displaced by the temperature expansion compensation element in the axial direction with respect to the axis of rotation of the pinion shafts. The temperature expansion compensation element has different dimensions in the axial direction at different temperatures, so that, for example, at a first temperature, it pushes the bearing less further away from the transmission housing or from the wall than at a second temperature or, conversely, at the second temperature, it pushes the bearing further away from the transmission housing than at the first temperature. The temperature expansion compensation element, for example, is composed of an elastomer, in particular a fluoroelastomer, more preferably Viton.

The bearing that is attached to the transmission housing by way of the temperature expansion compensation element can be designed as a fixed bearing or, alternatively, as a radial bearing, which, in at least one direction, can absorb forces in the axial direction. Fundamentally, however, any embodiment of the bearing is possible.

Another embodiment of the invention provides that another temperature expansion compensation element is associated with the first bearing and another temperature expansion compensation element is associated with the second bearing. Accordingly, therefore, a temperature expansion compensation element of this kind is associated with each of the two bearings. The other temperature expansion compensation element is preferably formed analogously to the temperature expansion compensation element, so that reference is made to the corresponding statements.

Another embodiment of the invention provides that the temperature expansion compensation element is arranged on the side of the first bearing that faces away from the first pinion, or the other temperature expansion compensation element is arranged on the side of the second bearing that faces away from the second pinion. The temperature expansion compensation element and the other temperature expansion compensation element are preferably arranged on sides of the bearings that lie opposite to each other in the axial direction. In this regard, the temperature expansion compensation element and the other temperature expansion compensation element accommodate the two bearings between them in the axial direction.

In the scope of another embodiment of the invention, it is provided that the first bearing is biased in the direction of the temperature expansion compensation element. To this end, for example, the first bearing is subjected to a spring force, which presses it in the direction of the temperature expansion compensation element or against it. The spring force can be applied, for example, at the first pinion shaft, and, by way of said first pinion shaft, act on the first bearing. For example, the spring force is directed in such a way that it pushes apart the first pinion shaft and the second pinion shaft or the first pinion and the second pinion in the axial direction.

If, besides the temperature expansion compensation element, the other or additional temperature expansion compensation element is provided, then the spring force presses the first bearing, for example, in the direction of the temperature expansion compensation element or against it, whereas it presses the second bearing in the direction of the additional temperature expansion compensation element or against it. Accordingly, as a result of the spring force acting on the two pinions, both the first bearing and the second bearing are biased in the direction of the respective temperature expansion compensation element.

Another preferred embodiment of the invention provides that the first bearing and the second bearing form a support bearing, in particular an X bearing or an O bearing, or a fixed/floating bearing, and/or that the second bearing is spring-loaded in the direction of the second pinion or in the direction pointing away from the second pinion. The support bearing is characterized in that the two bearings are each designed as radial bearings that can absorb axial forces in opposite directions. Thus, the first bearing delimits a displacement of the first pinion shaft in the axial direction in a first direction, and the second bearing delimits a displacement of the second pinion shaft in the axial direction in a second direction, which is opposite to the first direction.

In the case of the X bearing, the bearings limit a displacement of the pinion shafts or of the pinions away from each other, whereas, in the case of the O bearing or the pinions, the displacement toward each other is limited. Alternatively, the two bearings may also form the fixed/floating bearing, wherein one of the bearings—for example, the first bearing—is a fixed bearing and another of the bearings—that is, for example, the second bearing—is a floating bearing. The fixed bearing fixes in place the corresponding pinion shaft in the axial direction, whereas the floating bearing permits a displacement of the respective pinion shaft in the axial direction.

Additionally or alternatively, the second bearing can be spring-loaded, that is, subjected to a spring force effected by means of a spring element. The spring force preferably acts exclusively in the axial direction. In this case, it can be directed in the direction of the second pinion or in the direction opposite to it. For example, the spring force is effected by means of a disc spring. This spring force can either be applied at the second bearing on the side facing away from the second pinion or on the side facing the second pinion. In the former case, the second bearing is spring-loaded in the direction of the second pinion and, in the other case, it is spring-loaded in the direction facing away from the second pinion.

An enhancement of the invention provides that the two pinion shafts are mounted on one another by means of at least one spring-loaded axial bearing or that the two pinion shafts are mounted on one another by means of a plurality of axial bearings, with at least one of the axial bearings being spring-loaded. The at least one axial bearing can be designed as a tilted roller bearing or angular contact roller bearing, which can absorb axial forces in just one direction. Preferably, however, the axial bearing is designed simply as an axial bearing. As already indicated, the axial bearing can absorb axial forces only in one direction and thus forms a kind of end stop in one direction for the two pinion shafts against each other, whereas it permits a displacement of the pinion shafts in the opposite direction.

If a plurality of axial bearings are provided, then they limit the displacement of the two pinion shafts preferably in opposite axial directions. The axial bearing or at least one of the plurality of axial bearings is spring-loaded. If a plurality of axial bearings are provided, then the spring loading preferably occurs in such a way that a plurality of the bearings absorb forces in the axial direction and therefore prevent any further displacement of the two pinion shafts with respect to each other.

Another preferred embodiment of the invention provides that the two pinion shafts are mounted on one another by means of another axial bearing, wherein one of the pinion shafts is connected rigidly to the axial bearing in the axial direction and the other of the pinion shafts is connected to the other axial bearing in the axial direction by way of a temperature expansion compensation sleeve or is supported on it. As viewed in the axial direction, therefore, the axial bearing and the temperature expansion compensation sleeve are present in the operative connection between the two pinion shafts. This means that one of the pinion shafts is supported on the axial bearing, on which, in turn, the temperature expansion compensation sleeve is supported on the side opposite to the pinion shaft.

The other of the pinion shafts rests against the side of the temperature expansion compensation sleeve that faces away from the axial bearing. If the axial bearing or one of the plurality of axial bearings is spring-loaded, then the spring loading is preferably designed in such a way that one of the pinion shafts at the other axial bearing and the other of the pinion shafts are pressed against the temperature expansion compensation sleeve, so that, overall, the temperature expansion compensation sleeve is also pressed in the direction of the other axial bearing or toward it, so that the temperature expansion compensation sleeve is supported on the other axial bearing. The temperature expansion compensation sleeve is preferably provided when the temperature expansion compensation element is associated only with the first bearing or the second bearing, and, therefore, the other temperature expansion compensation element is not present.

In another embodiment of the invention, it can be provided that the temperature expansion compensation element has a larger thermal expansion coefficient than that of the transmission housing and/or that the temperature expansion compensation sleeve has a thermal expansion coefficient that differs from that of the transmission housing. In particular, to this end, the transmission housing, on the one hand, and the temperature expansion compensation element and/or the temperature expansion compensation sleeve, on the other hand, is or are composed of different materials or is or are composed of materials that have different thermal expansion coefficients. The thermal expansion coefficients of the temperature expansion compensation element and of the other temperature expansion compensation element are preferably chosen in such a way that each of the compensation elements compensates for about half of the expansion of the transmission housing due to temperature.

If the expansion compensation is to be achieved by means of the temperature expansion compensation element and the temperature expansion compensation sleeve, then, here, too, it applies that each of the elements effects about half of the compensation. To this end, the temperature expansion compensation sleeve has, for example, a thermal expansion coefficient that is higher or lower than that of the transmission housing. However, it may suffice if the temperature expansion compensation sleeve has the same thermal expansion coefficient as that of the transmission housing. An expansion coefficient that is higher or the same is provided, for example, by an embodiment of the temperature expansion compensation sleeve made of a light metal, such as, for example, aluminum or an aluminum alloy. If a lower thermal expansion coefficient is to be provided, then, for example, invar steel is employed as material for the temperature expansion compensation sleeve.

An enhancement of the invention provides that a spring element effecting the spring loading is designed in such a way that, at a design limit temperature, a partial compression of the spring element is present. The design limit temperature is, for example, the temperature that, during an operation of the transmission arrangement, is maximally expected or is even higher than that. During the operation of the transmission arrangement, a full compression of the spring element can be prevented in order to prevent undesired stresses within the transmission arrangement. For this reason, the spring element or the spring loading thereof is designed in such a way that, even when the design limit temperature is reached, only a partial compression of the spring element is present, so that a certain margin of safety in regard to the temperature is provided.

Finally, in a preferred embodiment of the invention, it can be provided that the two transmission output shafts are aligned with each other or are arranged axially parallel at a distance from one another. Reference to a configuration of this kind has already been made above.

BRIEF DESCRIPTION OF THE DRAWINGS

The invention will be explained in detail on the basis of the exemplary embodiments illustrated in the drawing, without any limitation of the invention thereby occurring. Shown herein are:

FIG. 3 a third embodiment of the transmission arrangement, once again in two different variants.

DETAILED DESCRIPTION

Figure 1:
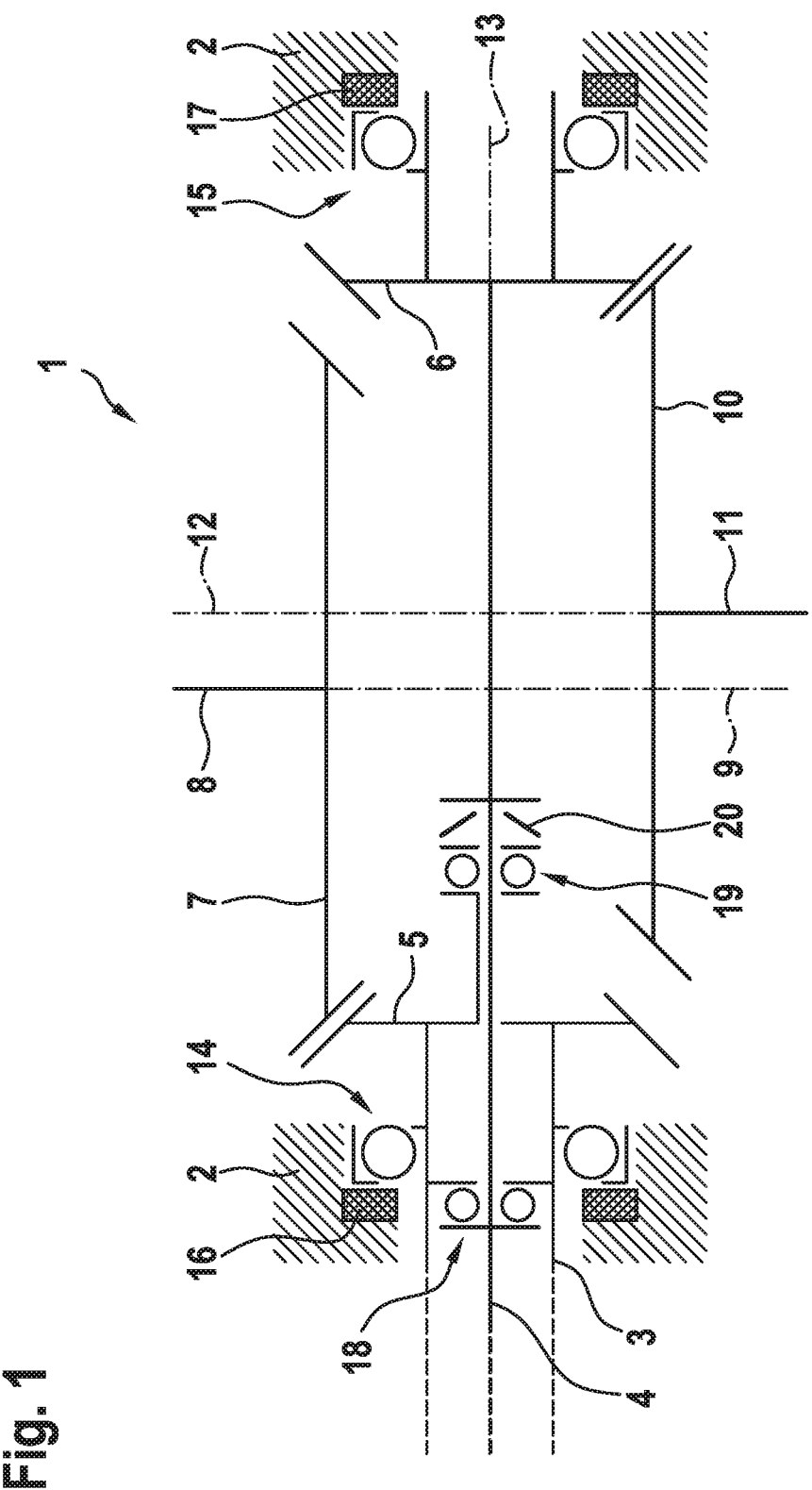
FIG. 1 a first embodiment of a transmission arrangement for a motor vehicle.

FIG. 1 shows a first embodiment of a transmission device 1 for a motor vehicle. The transmission arrangement 1 has a transmission housing 2, which is only hinted at here. The transmission device 1 is further equipped with a first pinion shaft 3 and a second pinion shaft 4, which is coaxially arranged in it. The first pinion shaft 3 is connected to a first pinion 5 and the second pinion shaft 4 is connected to a second pinion 6 or is designed in one piece therewith. The first pinion 5 meshes with a first crown gear 7, which is connected to a first transmission output shaft 8. The first crown gear 7 and the first transmission output shaft 8 are mounted so as to be able to rotate around an axis of rotation 9. In contrast, the second pinion 6 meshes with a second crown gear 10, which is connected to a second transmission output shaft 11.

The second crown gear 10 and the second transmission output shaft 11 are mounted so as to be able to rotate around an axis of rotation 12. On account of their coaxial arrangement, the two pinion shafts 3 and 4 and consequently the two pinions 5 and 6 are mounted so as to be able to rotate around a common axis of rotation 13. The bearing of the first pinion shaft 3 is provided by means of a first bearing 14 and that of the second pinion shaft 4 is provided by means of a second bearing 15. The pinion shafts 3 and 4 are mounted on the transmission housing 2 by way of the bearings 14 and 15.

The transmission housing 2 has a thermal expansion coefficient that differs from the thermal expansion coefficient of the first pinion shaft 3 and/or of the second pinion shaft 4. Accordingly, measures for temperature compensation or for compensation of different temperatures or thermal expansions of the transmission housing 2 and of the pinion shafts 3 and 4 are necessary. For this reason, the first bearing 14 is connected via a temperature expansion compensation element 16, and the second bearing 15 is connected via another temperature expansion compensation element 17, to the transmission housing 2. In particular, the bearings 14 and 15 are each supported in the axial direction against the transmission housing 2 by way of the respective temperature expansion compensation element 16 or 17. Accordingly, the bearings 14 and 15 can be displaced in the axial direction with respect to the axis of rotation 13 by the temperature expansion compensation elements 16 and 17.

However, because the temperature compensation can be adjusted precisely only to a single temperature by means of the temperature expansion compensation elements 16 and 17, it is provided that the two pinion shafts 3 and 4 are mounted to each other by means of a plurality of axial bearings—in the exemplary embodiment illustrated here, there are two axial bearings 18 and 19. The axial bearings 18 and 19 limit a displacement of the pinion shafts 3 and 4 with respect to each other in the axial direction in respectively opposite directions. In this case, the axial bearing 19 is spring-loaded by means of a spring element 20. The spring element 20 is preferably a disc spring. It rests against the second pinion shaft 4 and engages on its side facing away from the pinion shaft 4 at the axial bearing 19, which, on its part, is supported on the first pinion shaft 3 in the axial direction.

In this regard, the spring element 20 effects a spring force in the axial direction, which presses apart the two pinions 5 and 6, so that the two bearings 14 and 15 are biased outward in the axial direction. In particular, the spring element 20 is designed such that the pinion shafts 3 and 4 are displaced in the axial direction so that, in the axial direction, the axial bearing 18 rests, on the one hand, against the pinion shaft 3 and, on the other hand, against the pinion shaft 4.

In this regard, the spring element 20 counteracts a displacement of the bearings 14 and 15 by the temperature expansion compensation elements 16 and 17 or effects a restoration of the bearings 14 and 15 in the case of decreasing dimensions of the temperature expansion compensation elements 16 and 17 in the axial direction. Preferably, it is provided that the axial bearings 18 and 19 are arranged on different sides of the first pinion 5—as viewed in the axial direction.

It can be seen that the pinions 5 and 6 have the same diameter. The same is true also for the crown gears 7 and 10. However, this makes it necessary for the axes of rotation 9 and 12 of the crown gears 7 and 10 or of the transmission output shafts 8 and 11 to be arranged at an offset, namely, spaced apart from each other in the axial direction with respect to the axis of rotation 13. In this regard, the axes of rotation 9 and 12 are spaced parallel to each other. Preferably, in addition, the axes of rotation 9 and 12 are situated perpendicularly on an imaginary plane that incorporates in it the axis of rotation 13. It can also be provided that the axes of rotation 9 and 12 are each situated perpendicular to the axis of rotation 13.

Figure 2:
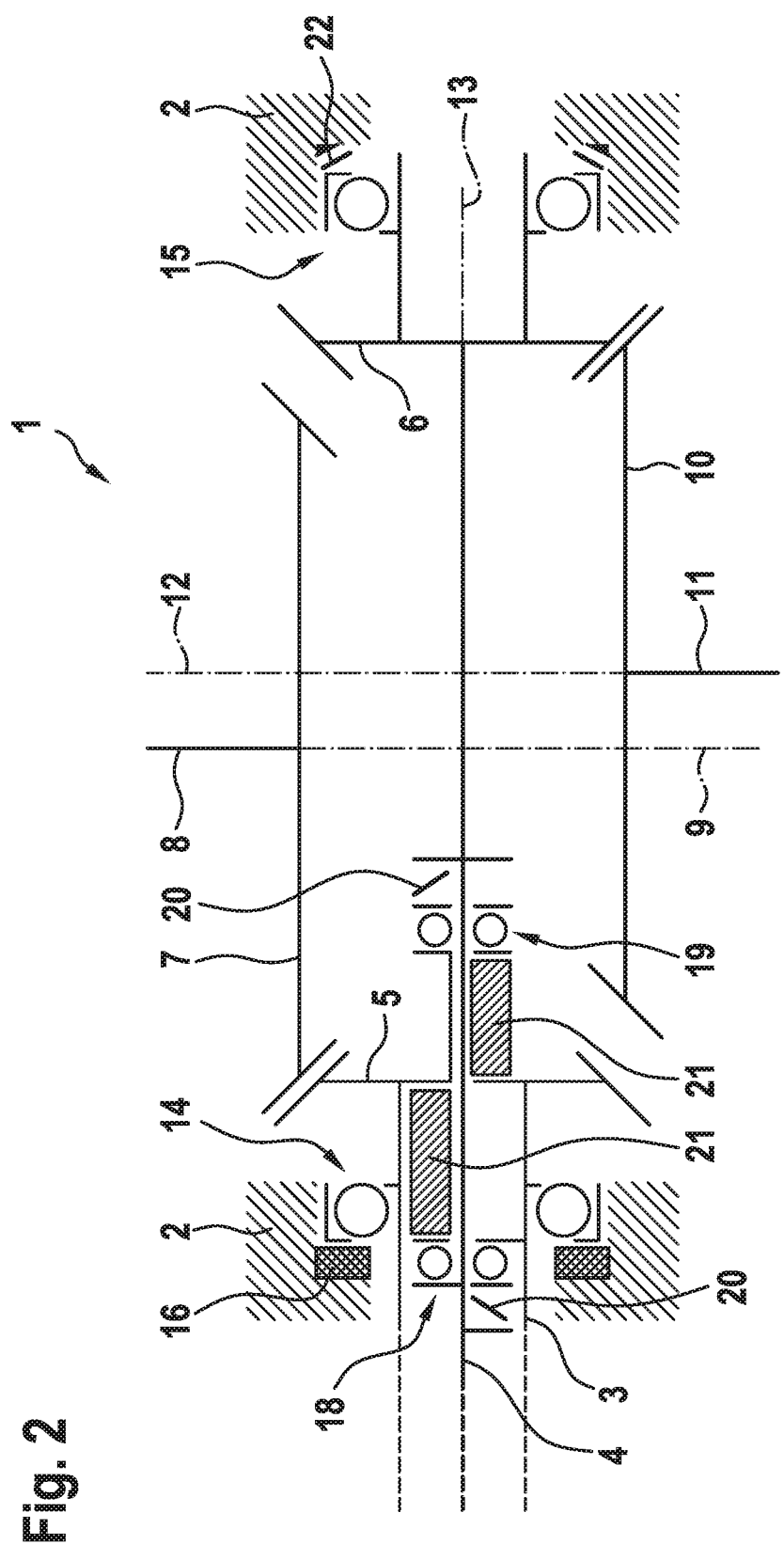
FIG. 2 a second embodiment of the transmission arrangement in two different variants.

FIG. 2 shows a second embodiment of the transmission device 1 in two different variants, wherein a first of the variants is illustrated above the axis of rotation 13 and a second of the variants is illustrated below the axis of rotation 13. Reference is basically made to the preceding statements relating to the first embodiment and the differences will be addressed below. Said differences lie essentially in the fact that the temperature expansion compensation element 16, but not the temperature expansion compensation element 17, is provided. The function of the temperature expansion compensation element 17 is assumed in the scope of the second embodiment by a temperature expansion compensation sleeve 21.

For the first variant, said temperature expansion compensation sleeve is present in the axial direction between the axial bearing 18 and the first pinion shaft 3, particularly between the axial bearing 18 and the first pinion 5. This means that the temperature expansion compensation sleeve 21 is supported, on the one hand, at the first pinion shaft 3 or the first pinion 5, and, on the other hand, at the axial bearing 18, which, in turn, rests against the second pinion shaft 4 on its side facing away from the temperature expansion compensation sleeve 21, as viewed in the axial direction, or is supported against it. The temperature expansion compensation sleeve 21 preferably has a thermal expansion coefficient that differs from that of the transmission housing 2, in particular a higher thermal expansion coefficient. The axial bearing 19 is spring-loaded, in turn, by means of the spring element 20, so that it presses the first pinion shaft 3 or the first pinion 5 against the axial bearing 18, and the latter, in turn, as viewed in the axial direction, against the second pinion shaft 4.

Furthermore, it is provided that the second bearing 15 is spring-loaded by means of a spring element 22, which, in turn, can be designed as a disc spring. In this case, the spring loading on the second bearing 15 is preferably directed in the axial direction toward the first bearing 14. The spring element 22 is designed such that, when a design limit temperature is reached, a full compression of the spring element 22 does not occur, but instead only a partial compression occurs. The spring element 22 has, for example, a remaining spring path limitation, in particular by a configuration with a blocking sleeve.

The second variant of the second embodiment differs from the first variant only in that, as viewed in the axial direction, the temperature expansion compensation sleeve 21 is now present between the first pinion shaft 3 or the first pinion 5 and the axial bearing 19, which, on its side facing away from the temperature expansion compensation sleeve 21, is supported against the second pinion shaft 4 in the axial direction. Furthermore, the spring element 20 is then associated with the axial bearing 18, so that the latter is therefore spring-loaded. Otherwise, reference is made to the configurations relative to the first variant of the second embodiment.

FIG. 3 shows a third embodiment of the transmission device 1, once again in two variants. A first of the variants is illustrated above the axis of rotation 13, and a second below the axis of rotation 13. In regard to the third embodiment, reference is made to the statements in regard to the second embodiment and said statements are included here in full. Only the differences will be addressed below. Apart from the differences that are yet to be explained, the first variant of the third embodiment corresponds to the first variant of the second embodiment, and the second variant of the third embodiment corresponds to the second variant of the second embodiment.

The differences from the second embodiment of the transmission device 1 lie in the fact that the first bearing 14 is designed as a fixed bearing and the second bearing 15 is designed as a floating bearing. In this case, both bearings 14 and 15 are designed such that they can absorb the axial forces in both directions. The bearings 14 and 15 can fundamentally be arranged so as to be displaced in the axial direction in the transmission housing 2. The first bearing 14 is present as a fixed bearing, because it is rigidly clamped between the temperature expansion compensation element 16 and a spring element 23, so that it can be displaced in the axial direction exclusively based on temperature-induced changes in the dimensions of the transmission housing 2 and/or of the temperature expansion compensation element 16. On its side facing away from first bearing 14 in the axial direction, the spring element 23 is supported against the transmission housing 2, for example, via a supporting element 24, in particular a securing ring or snap ring.

The second bearing 15 is basically designed as a floating bearing. It is subjected to spring force in the axial direction by the spring element 22, with the spring force pressing the second bearing 15 in the axial direction away from the first bearing 14. However, the spring element 22 has only a small biasing. The first bearing 14 and the second bearing 15 together form a fixed/floating bearing for the pinion shafts 3 and 4.

The above-described transmission device 1 makes possible an especially reliable compensation of temperature-induced stresses. In particular, it can be flexibly designed; for example, it enables a flexible selection of the bearing configuration. Thus, the first bearing 14 and the second bearing 15 can be designed as support bearings, as is illustrated on the basis of the first and second embodiment, for example. However, it is also possible to provide a fixed/floating bearing in accordance with the third embodiment.

The invention claimed is:

1. A transmission arrangement for a motor vehicle, comprising:
a transmission housing, a first pinion shaft, and a second pinion shaft, which is arranged coaxially relative to the first pinion shaft, and having a first transmission output shaft and a second transmission output shaft, wherein the first pinion shaft is mounted by a first bearing, and the second pinion shaft is mounted by a second bearing, on the transmission housing, and wherein a first pinion meshing with a first crown gear arranged on the first transmission output shaft is arranged on the first pinion shaft in a rotationally fixed manner, and a second pinion meshing with a second crown gear arranged on the second transmission output shaft is arranged on the second pinion shaft in a rotationally fixed manner, wherein the first bearing or the second bearing is connected to the transmission housing by a temperature expansion compensation element and can be displaced in the axial direction with respect to an axis of rotation of the pinion shaft by the temperature expansion compensation element, wherein the two pinion shafts are mounted together by at least one spring-loaded axial bearing, or the two pinion shafts are mounted together by a plurality of axial bearings and at least one of the axial bearings is spring-loaded, wherein a spring element effecting the spring loading forces the first pinion and the second pinion apart from each other.

2. The transmission arrangement according to claim 1, wherein the temperature expansion compensation element is associated with the first bearing, and another temperature expansion compensation element is associated with the second bearing.

3. The transmission arrangement according to claim 2, wherein the temperature expansion compensation element is arranged on the side of the first bearing that faces away from the first pinion, and/or the other temperature expansion compensation element is arranged on the side of the second bearing that faces away from the second pinion.

4. The transmission arrangement according to claim 1, wherein the first bearing is biased in the direction of the temperature expansion compensation element.

5. The transmission arrangement according to claim 1, wherein the first bearing and the second bearing form a support bearing, or form a fixed/floating bearing, and/or the second bearing is spring-loaded in the direction of the second pinion or in the direction facing away from the second pinion.

6. The transmission arrangement according to claim 1, wherein the two pinion shafts are mounted together by means of a second axial bearing, wherein one of the pinion shafts is connected rigidly to the first axial bearing in the axial direction, and the other pinion shaft is connected to the second axial bearing in the axial direction by way of a temperature expansion compensation sleeve or is supported against it.

7. The transmission arrangement according to claim 6, wherein the temperature expansion compensation element has a larger thermal expansion coefficient than the transmission housing, and/or the temperature expansion compensation sleeve has a thermal expansion coefficient differing from that of the transmission housing.

8. The transmission arrangement according to claim 1, wherein the spring element effecting the spring loading is partially compressed at a design limit temperature.

9. The transmission arrangement according to claim 1, wherein:
the two transmission output shafts are aligned with each other or are arranged axially parallel at a distance from one another.

* * * * *